United States Patent [19]

Kahn

[11] 4,099,025

[45] Jul. 4, 1978

[54] METHODS AND MEANS FOR AVOIDING FALSE INDICATIONS OF ACTIVITY IN A MULTIMICROPHONE SYSTEM

[76] Inventor: Leonard R. Kahn, 70 N. Grove St., Freeport, N.Y. 11520

[21] Appl. No.: 727,179

[22] Filed: Sep. 27, 1976

[51] Int. Cl.[2] ........ H04M 3/56

[52] U.S. Cl. ........ 179/1 CN; 179/1 VC

[58] Field of Search ........ 179/1 CN, 1 VC, 1 AT

[56] References Cited

U.S. PATENT DOCUMENTS

| | | | |
|---|---|---|---|
| 3,694,578 | 9/1972 | Reid | 179/1 CN |
| 3,730,995 | 5/1973 | Mathews | 179/1 CN |
| 3,755,625 | 8/1973 | Maston | 179/1 CN |
| 3,944,736 | 3/1976 | Shepard | 179/1 CN |

FOREIGN PATENT DOCUMENTS

| | | | |
|---|---|---|---|
| 36,074 | 7/1968 | Japan | 179/1 VC |

*Primary Examiner*—Kathleen H. Claffy
*Assistant Examiner*—Kenneth A. Chayt

[57] ABSTRACT

Means and method of reducing the probability of false indications of microphone activity in a multimicrophone system incorporating means for sensing the activity of microphones.

The microphone, which is truly active, will receive its signal from its user before any of the other microphones receive the signal. The microphone circuit then sends a control wave to all of the other microphone channels reducing their amplifier's sensitivity and making them insensitive to false indication of activity.

11 Claims, 2 Drawing Figures

METHODS AND MEANS FOR AVOIDING FALSE INDICATIONS OF ACTIVITY IN A MULTIMICROPHONE SYSTEM

BACKGROUND OF THE INVENTION

If a number of microphones are used to service conference participants, it sometimes is desirable to provide means for automatically turning on those microphones that are active, (those whose users are speaking), and maintain other microphones inactive so as to reduce noise and reverberation. When automatic control of the microphones is undesirable and an operator is required to manually control the system, a visual indication of whether a microphone is active is of great assistance to the operator.

Unfortunately, the voice level of different speakers may vary over a range of 20 or 30 db, and if the sensitivity of a system is sufficient to be controlled by the weakest speaker, a neighbor's speech can falsely energize the wrong microphone if he raises his voice. If one uses a system whereby the strongest signal is used to disable the other microphones, it becomes difficult to interrupt a speaker. Such limitations would create severe problems in a fully automatic system and provide false information to the operator in a manually operated system.

In U.S. Pat. No. 3,879,701, issued to Mr. Stagg, a sonar detection device for passively acquiring frequency bearings and general azimuth to echo ranging vessels using a circular array is described. Logic gating is provided to insure that no other signals interfere with the signal which first arrives and which meets certain requirements. However, this sonar device does not deal with speech and does not provide any means for allowing a weaker and later signal to interrupt unless it is positioned at a particular bearing relative to the first signal to be detected.

U.S. Pat. Nos. 2,039,104 (Morris), 3,755,625 (Maston), and 3,944,736 (Shepard) on the other hand do relate to the processing of speech and or speech and music.

The Morris invention, U.S. Pat. No. 2,039,104, describes a means by which a desired time delay is obtained in a system comprising a combined acoustical path and electrical circuit.

The Matson invention, U.S. Pat. No. 3,755,625 deals with the speakerphone conference systems and selects the microphone with the greatest output. To seize control by another microphone the speaker, into that microphone, must speak louder than the speaker he wishes to interrupt by some predetermined amount; for example, 3 db.

The Shepard invention, U.S. Pat. No. 3,944,736, covers a video communications system for switching cameras and speech equipment automatically and includes voice operated switching circuits, audio level discrimination circuits for eliminating low level noise and locking out access to the control when another circuit has been previously activated. The invention also incorporates audio duration control for controlling the activation of the circuit and avoiding access to the circuit during pauses in speech. An attack time control is provided for preventing short duration signals from falsely operating the system. The patent also describes means for coordinating the various control features of the system.

None of the above cited patents discloses means whereby a person speaking softly can interrupt a person speaking loudly so that both speakers can be heard and the meeting chairman has the opportunity to recognize the new speaker.

SUMMARY OF THE INVENTION

An object of the present invention is to allow an automatic microphone switching system to be sensitive enough to be activated by low level speech while at the same time protected against false operation by vociferous neighbor's speech.

A further object is to avoid false operation of microphones located adjacent to active microphones.

An additional object of the invention is to allow an individual to interrupt a speaker without requiring him to speak very loudly.

An object of an embodiment of the invention used with manually operated systems is to provide the operator with a quick and accurate indication of microphone activitiy.

The new system is based upon the fact that a speaker's voice wave will reach the closest microphone before the wave reaches adjacent microphones. This time difference allows the microphone circuit first activated time to produce a desensitization wave which desensitizes adjacent microphones before they can be falsely activated.

The possibility of interrupting a speaker is based upon the dissimilarity of independent voice waves. For example, the times of occurrence of the speech burst of two speech waves are independent. Accordingly, it is highly improbable that two voice signals will have similar speech burst timing characteristics. The fact that the waves are thus readily distinguished makes it possible for the system to provide protection against strong voice waves caused by one speaker while allowing relatively weak voice waves from another independent source to activate a microphone. Thus, while a microphone is protected against a neighboring speaker's voice a person speaking softly but with a different speech burst pattern can activate the protected microphone.

The desensitization wave must have special characteristics; otherwise, it will make it difficult for a person using one of the previously inactive microphones to interrupt a speaker. For example, the duration of the desensitization wave must not be too long or the person wishing to interrupt will be blocked for too long a period. The duration of the wave should be just long enough so that the farthest microphone is still desensitized when the speech wave reaches it. Since sound travels at approximately one foot per millisecond, the duration of the desensitization wave in milliseconds should approximately equal the largest spacing of microphones in feet. Thus, if the speaker is d feet from the remotest microphone the duration of the control wave should be approximately d milliseconds.

Also, the sound level required to activate the desensitization wave should be equal to or greater than the level required to initiate or sustain the microphone activity sensing circuit. It is important that weak speech sounds do not cause the desensitization wave to be produced but only sounds strong enough to cause false microphone activity indications in neighboring microphones. Otherwise, the desensitization wave will be active when it is not required and will tend to block interruptions. In fact, in many situations, it may be best to provide a separate threshold circuit set to a lower sensitivity point than the threshold for the signal presence circuit. One such situation is where directional microphones are used and/or the microphones are spaced apart by a substantial distance so that the level difference between adjacent microphones is substantially different. In such cases, separate threshold circuits with the threshold for the desensitization control wave set to a higher less sensitive point will improve system operation. In many situations it is desirable to provide threshold adjustments and the control for one threshold circuit can be mechanically or electrically ganged with the control of the other threshold circuit with an appropriate offset.

The signal presence determination circuit may be used to cause a lamp to glow prompting an operator and it can be used to control a gate in a fully automatic system. It can also be used to control a gate in a manually operated system which can be overriden by the operator when desirable.

These, and other objects, features, characteristics, and advantages of the systems and methods of the invention will be apparent from the following description of certain typical forms thereof taken together with the accompanying drawing.

DESCRIPTION OF THE PREFERRED EMBODIMENTS

Figure 1:
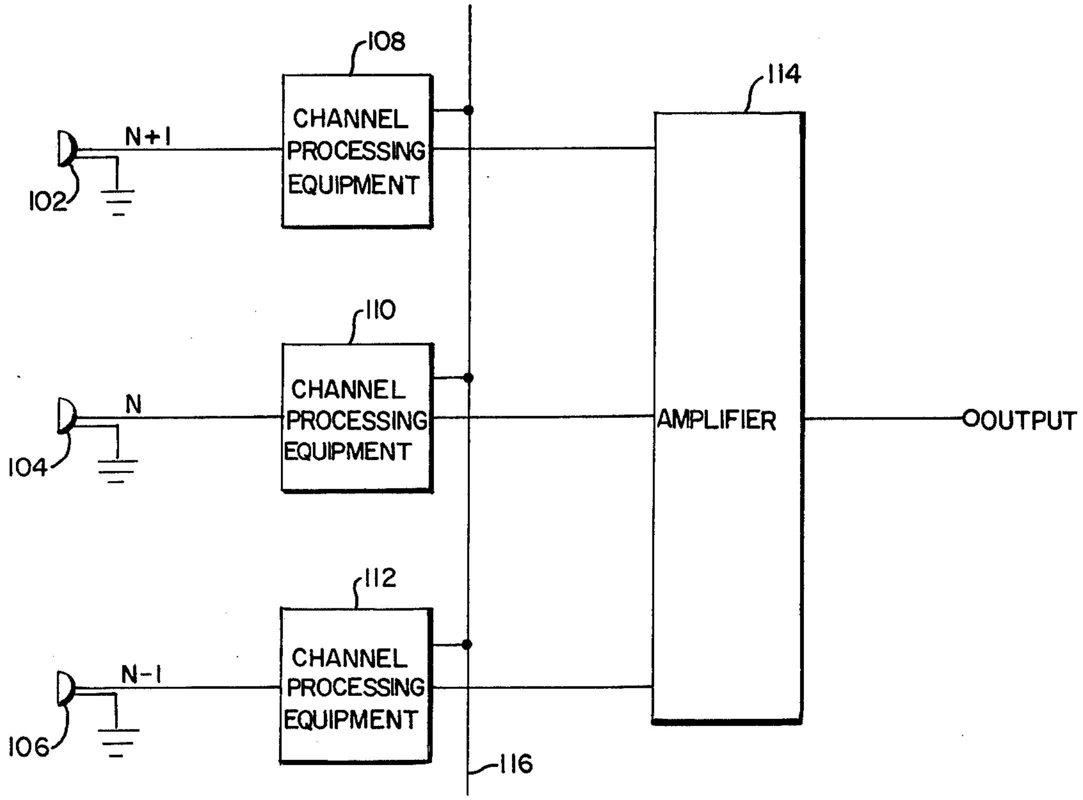
FIG. 1 is a block-schematic drawing of one embodiment of the overall system.

FIG. 1 is a diagram showing the overall structure of a preferred embodiment of the instant invention. Three microphones are shown in this block; however, any number in excess of one might be used. The three microphones are 102, 104 and 106, and they are the N+1, the N, and N−1 microphones respectively. These microphones feed channel processing equipment blocks 108, 110 and 112. The output of these channel processing equipments feed amplifier 114 which in turn feeds the utilization output circuit.

A control line 116 is used as a common connection between the various channel processing equipments.

Figure 2:
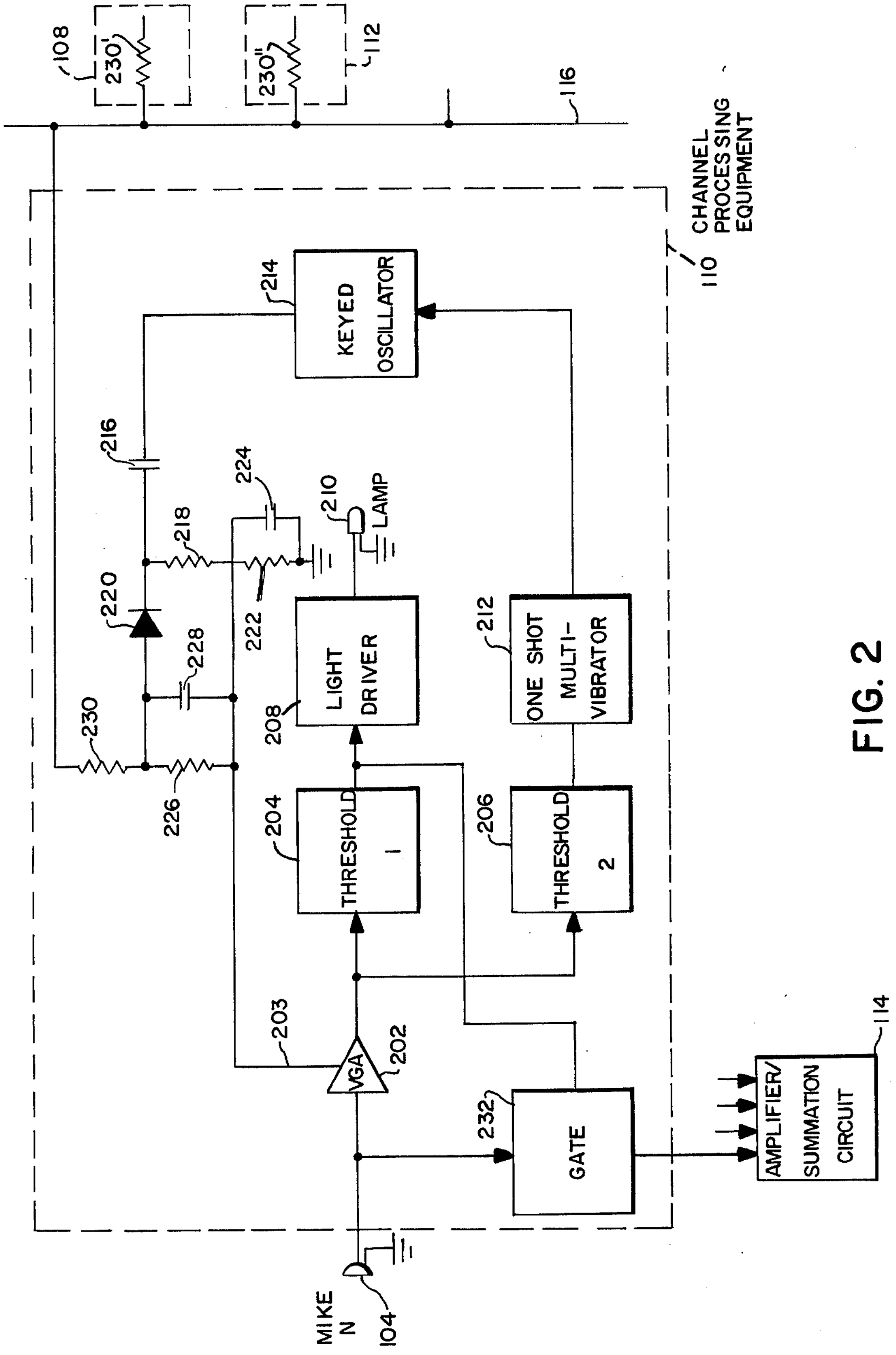
FIG. 2 shows a more detailed block-schematic drawing of block 110 of FIG. 1.

FIG. 2 shows in detail the circuitry contained in the channel processing equipment blocks. The equipment would be identical for use in blocks 108, 110 and 112 and any other channel process blocks used for additional microphone channels. Microphone 104 is connected to variable gain amplifier 202. The gain of this amplifier is controlled by the voltage appearing across resistor 222 connected to lead 203 which connects to the gain control treatment of VGA 202. The gain is, for example, reduced when a negative voltage is fed to the variable gain amplifier control terminal. Of course, instead of a variable gain amplifier a variable attenuator or any other variable transfer function device may be substituted so long as the ratio of output to input level may be controlled.

The output of the variable gain amplifier 202 feeds threshold circuit 1, block 204. This threshold circuit is adjusted so that when the microphone picks up the voice at some predetermined level the threshold circuit will operate producing an output. This output feeds light driver 208 which in turn feeds light 210. Thus, when the input mike level is of sufficient amplitude, light 210 is caused to glow. The output of threshold 1 is also connected to a gate 232 which automatically closes when sufficient level signals are picked up by mike 104, thus activating the N mike channel.

In the case of the manually operated system, gate 232 would be operated by a manually controlled switching circuit and the output of 204 would not feed gate 232. The operator of the manual switching system would be assisted by the light 210 which glows when mike 104 is active. If the system is completely automatic, lamp 210 and light driver 208 are not required except as a maintenance convenience. The output of gate 232 feeds amplifier summation circuit 114 wherein the various active microphone signals are combined. The output of variable amplifier 202 also feeds threshold circuit 2, block 206. This threshold circuit is not necessary if adjacent microphone levels are fairly close and threshold circuit 204 can be used for the additional service. In other words, if non-directional microphones are used and they are fairly close in physical location, one threshold circuit will suffice. However, if the microphones are substantially spaced or are directional, there would be a considerable difference in level between the microphone in front of a speaker and the microphone in the next location. In that case, a second threshold circuit would be useful in that it could be set so that only louder voice signals overcome the threshold. The difference in threshold settings between threshold 1, 204 and threshold 2, 206 would be approximately equal to the attenuation of the sound between the two microphones.

The output of threshold 2, 206 feeds a one shot multivibrator circuit 212. When the threshold is overcome, the one shot multivibrator will produce a pulse. The duration of the pulse should be long enough so that it disables even the microphone furthest from the speaker. In other words, if it takes 50 milliseconds for the voice sound to reach the most distant microphone in the system, the multivibrator should produce a pulse having a duration of at least 50 milliseconds. The pulse should not be too much longer than the 50 milliseconds, in this example, because it will make it more difficult to interrupt speech. As an extreme example, suppose a 10 second pulse was used. Since speech peaks in a continuous speech wave occur more often than once every 10 seconds, a speaker could block operation of the other microphone, making it impractical to interrupt him.

The output of one shot multivibrator 212 feeds keyed oscillator 214. This oscillator, which should operate at a supersonic rate in order to avoid undesired audible crosstalk, is keyed on by the multivibrator output. As an example, the oscillator might operate at 100 kHz. Keyed oscillator 214 can be replaced by a single oscillator common to all of the channels which then feeds individual keyers. Thus, instead of a block having a keyed oscillator 214, a keyer would be substituted which would be keyed by the one shot multivibrator 212 and whose second input would be fed by a common oscillator and the keyed output would feed capacitor 216. The keyed output then feeds coupling capacitor 216 which then in turn feeds diode detector circuit composed of resistors 218 and 226, capacitor 228, and diode 220.

The connection of 220 is such that a negative dc voltage would appear across resistor 226. Capacitor 228 attenuates the ripple frequency. This voltage would then be fed through resistor 230 to common bus 116 and would reduce the gain of the channel processing equipments 108 and 112, through resistors 230′ and 230″, and any other microphone channeling equipment connected to the bus. However, the voltage does not alter the gain of variable gain amplifier 202 in block 110 because of the connection of the detector circuit. Resistor 222 and capacitor 224 provides a return and bypass circuit for variable gain amplifier 202.

When mike N+1 which is connected to the channel processing equipment, block 108, has a strong voice signal applied, it will produce a negative voltage through resistor 230' to line 116 and reduce the gain of variable gain amplifier 202 in block 110, as well as the variable gain circuit in block 112, although its own variable gain amplifier in block 108 would not be controlled. Of course, one skilled in the art may decide to use other circuits for the circuit shown in FIG. 2; for example, optically coupled devices, for producing gain control voltage on line 116 without simultaneously reducing its own internal gain.

The time constants in the envelope detector circuit; i.e., those determined by resistor 226 and capacitor 228 should be short, less than, say, one millisecond, so that the gain reduction voltage is produced rapidly, disabling the closest microphone being protected whenever the one shot multivibrator produces a pulse, and also should allow rapid recovery, say 10 milliseconds, of the gains in the various channel processing equipment when the one shot multivibrator d millisecond pulse is completed. This will allow protection from false operation of the microphones and at the same time allow other speakers to interrupt.

FIG. 2 shows the use of conventional level determining threshold circuits to sense the presence of signal to control a lamp and/or close a gate, and to initiate the gain reduction control wave. If the system is used in noisy locations, a more sophisticated circuit, such as disclosed in U.S. Pat. No. Re. 27,202 or patent application Ser. No. 693,716 is desirable.

From the foregoing, further variations and applications of the invention will be apparent to those skilled in the art to which the invention is addressed, within the scope of the following claims.

What is claimed is:

1. In a multi-microphone manually operated system the improvement comprising;

(a) indicator devices for providing an operator with information as to speech activity at the microphones, said devices controlled by the audio level sensed in the individual microphone channels, (b) means for sensing that the speech level at the microphone closest to a speaker is of a lever likely to cause false indication of speech activity at at least a second microphone.

(c) means for generating a desensitization wave whenever (b) sensing means is activated, said wave having a duration just sufficient to reliably protect the indicator circuit for the microphone furthest from the properly activated microphone; and, (d) means for coupling the wave to the indicator devices control circuits so that all indicator circuits, except the one associated with the microphone closest to the speaker, are insensitive to the speech signal produced by said speaker.

2. The system of claim 1, wherein the (a) indicator devices are individual lamps.

3. The method for preventing a false indication of microphone activity in a multi-microphone system; comprising, (a) amplifying a sample of each microphone output in individual variable gain amplifiers, (b) determining if the output of Step (a) amplification exceeds a first threshold level, (c) using the (b) step determination to initiate a control wave having the proper amplitude and polarity to cause a substantial reduction of gain in the individual variable gain amplifiers of Step (a), (d) coupling said control wave to the gain reduction control circuits of all of the variable gain amplifiers except the amplifier associated with the microphone circuit that initiated the control wave, (e) determining if the output of Step (a) amplification exceeds a second threshold level; and, (f) using the (e) step determination to operate visual indication devices so as to assist the operator of a microphone switching system.

4. A method of reducing the probability of false indications of microphone activity in a multimicrophone system incorporating means for sensing the activity of microphones; comprising, (a) controlling the transfer function of individual devices through which at least part of the output of each microphone is passed, (b) determining if the output of the devices used in Step (a) exceeds a first threshold level, (c) generating a control wave for decreasing the transfer function whenever the step (b) determination indicates signal is present having an amplitude likely to produce a false indication of activity in another microphone in the system, said control wave having a duration approximately equal to the time it takes for the sensed sound to reach the remotest microphone in the system, (d) feeding the generated control wave of Step (c) to the circuitry used to provide the controlled transfer function of Step (a) so as to protect the channels from false indication while avoiding substantial desensitization of the channel first activated, (e) determining if the output of the (a) step devices exceeds a second threshold level, and, (f) gating on the signal from the sensed microphone when step (e) determination is positive.

5. A multimicrophone system for determining the activity of individual microphones, comprising;

(a) a multiplicity of microphones, (b) a multiplicity of variable gain means, one means connected to each microphone, (c) first threshold means with a first threshold level, to sense if the speech level present at one microphone is of a level likely to cause false operation of at least a second microphone, (d) means for generating a desensitization wave whenever (c) means senses a level likely to cause false operation, said desensitization wave having a duration just sufficient to reliably protect the remotest microphone, (e) means for coupling the desensitization wave to the system so that all microphones except the one first sensing the speech wave are desensitized by the wave produced in (d) means, (f) second threshold means for comparing speech levels with a second threshold level, fed by the output of (a) means, connected to and controlling, a multiplicity of devices, each having one condition when signal is present and a second condition when signals are absent, the conditions of said devices being determined by the second threshold means.

6. The system of claim 5 where said devices are visual indicators.

7. The system of claim 5 where said devices are signal gates.

8. The system of claim 5 where the (f) threshold means detect lower level signals than the corresponding (c) threshold means.

9. A method of reducing the probability of false indications of microphone activity in a multimicrophone system incorporating means for sensing the activity of microphones; comprising, (a) controlling the transfer functions of individual devices through which at least a part of the output of each microphone is passed, (b) determining if the output of the devices used in Step (a) exceeds a threshold level, (c) generating a control wave for decreasing the transfer function of said devices whenever the Step (b) determination indicates signal is present having an amplitude likely to produce a false indication of activity in another microphone in the system, said control wave having a duration approximately equal to the time it takes for the sensed sound to reach the remotest microphone in the system, (d) feeding the generated control wave of Step (c) to the circuitry used to provide the controlled transfer function of Step (a) so as to protect the channels from false indication while avoiding substantial desensitization of the channel first activated, (e) sensing the level of signals at the output of said devices in additional threshold circuitry set to a lower threshold level than the Step (b) level, and (f) using the Step (e) signal level determination to switch associated switching circuitry having a signal present state and a signal absent state to the signal present state.

10. The method for preventing a false indication of microphone activity in a multimicrophone system equipped with automatic activity sensing circuitry; comprising, (a) amplifying a sample of each microphone output in individual variable gain amplifiers, (b) determining if the output of Step (a) amplification exceeds a first threshold level, (c) using the (b) step determination to initiate a control wave having the proper amplitude and polarity to cause a substantial reduction of gain in the individual variable gain amplifiers of Step (a), (d) coupling said control wave to the control circuit of all of the variable gain amplifiers except the microphone circuit that initiated the control wave, (e) determining if the output of Step (a) amplification exceeds a second threshold level, and, (f) using the (e) step determination to switch circuitry to a signal present condition.

11. The method of claim 10 wherein the (e) step determination utilizes a lower level of threshold voltage making its sensitivity higher than that of the signal presence determination step used for activating the pulse of Step (c).

* * * * *